US006392840B1

(12) United States Patent
Chen

(10) Patent No.: US 6,392,840 B1
(45) Date of Patent: May 21, 2002

(54) PLANARIZED SIDE BY SIDE DESIGN OF AN INDUCTIVE WRITER AND SINGLE METALLIC MAGNETORESISTIVE READER

(75) Inventor: Tsung Y. Chen, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/986,491

(22) Filed: Dec. 8, 1997

(51) Int. Cl.$^7$ .......................... G11B 5/147; G11B 5/235
(52) U.S. Cl. ........................................ 360/126; 360/120
(58) Field of Search ......................... 360/113, 119–127, 360/317

(56) References Cited

U.S. PATENT DOCUMENTS

| | | | |
|---|---|---|---|
| 3,908,194 A | | 9/1975 | Romankiw ................... 360/113 |
| 4,044,394 A | | 8/1977 | Hanazono et al. ........... 360/123 |
| 4,685,005 A | | 8/1987 | Fields, Jr. ...................... 360/53 |
| 5,027,245 A | * | 6/1991 | Nagata et al. ............... 360/121 |
| 5,208,714 A | | 5/1993 | Denison et al. ............. 360/113 |
| 5,212,611 A | * | 5/1993 | Dee ............................. 360/113 |
| 5,285,341 A | * | 2/1994 | Suzuki et al. ............... 360/121 |
| 5,296,993 A | | 3/1994 | Aboaf et al. ................ 360/126 |
| 5,438,470 A | | 8/1995 | Ravipati et al. ............ 360/113 |
| 5,541,793 A | * | 7/1996 | Schwarz ..................... 360/121 |

FOREIGN PATENT DOCUMENTS

| | | | |
|---|---|---|---|
| JP | 55-087496 | * | 7/1980 |
| JP | 56-127913 | | 1/1982 |
| JP | 58-84412 | * | 5/1983 |
| JP | 58-111116 | | 7/1983 |
| JP | 63-88908 | * | 4/1988 |
| JP | 62-250507 | | 4/1988 |
| JP | 2-310812 | * | 12/1990 |
| JP | 3286413 | | 12/1991 |
| JP | 4-98607 | | 7/1992 |
| JP | 6-202132 | * | 7/1994 |
| JP | 9-245312 | * | 9/1997 |

OTHER PUBLICATIONS

C.H. Bajorek et al, "An Integrated Magnetoresistive Read, Inductive Write High Density Recording Head", AIP Conference Proceedings, Magnetism & Magnetic Materials, No. 24, pp. 548–549, (1974).
C.H. Bajorek et al, "Modified Magnetoresistive Head", IBM Technical Disclosure Bulletin, Oct., vol. 16, No. 5, p. 1372, (1973).
M. Barlow et al, "Thin Film Magnetic Head Assembly", IBM Technical Disclosure Bulletin, Sep., vol. 24, No. 4, pp. 1912–1913 (1981).
J.E. Rohen et al, "Protected High–Density Mr Head", IBM Technical Disclosure Bulletin, Nov., vol. 24, No. 6, pp. 2978 (1981).
D.L. Beam et al, "Self–Aligned Two–Step Process For Flux Enhancement In Magnetoresistive Sensors", IBM Technical Disclosure Bulletin, Dec., vol. 26, No. 7A, pp. 3127–3128, (1983).
"Magnetic Head Instability", IBM Technical Disclosure Bulletin, Aug., vol. 31, No. 3, p. 177 (1988).
"Process for Making Interleaved Magnetic Head", IBM Technical Disclosure Bulletin, Oct., vol. 35, No. 5, p. 304 (1992).

* cited by examiner

*Primary Examiner*—William Klimowicz

(57) ABSTRACT

In accordance with the present invention, an interleaved bi-directional magnetic tape head is provided in which the read element, write element, and servo element are formed on a common substrate. Each element has a contact pad area electrically associated withit, with each contact pad area located in a plane common to all contact pad areas. That is, the contact pad areas are planarized to each other. As a result of such planarization, two gold conduction layers, required in the prior art, are reduced to one layer. Further, the total number of mask layers is two less than the prior art, with a concomitant reduction in device fabrication time. Additionally, the unit cell size is reduced by about one-third.

16 Claims, 5 Drawing Sheets

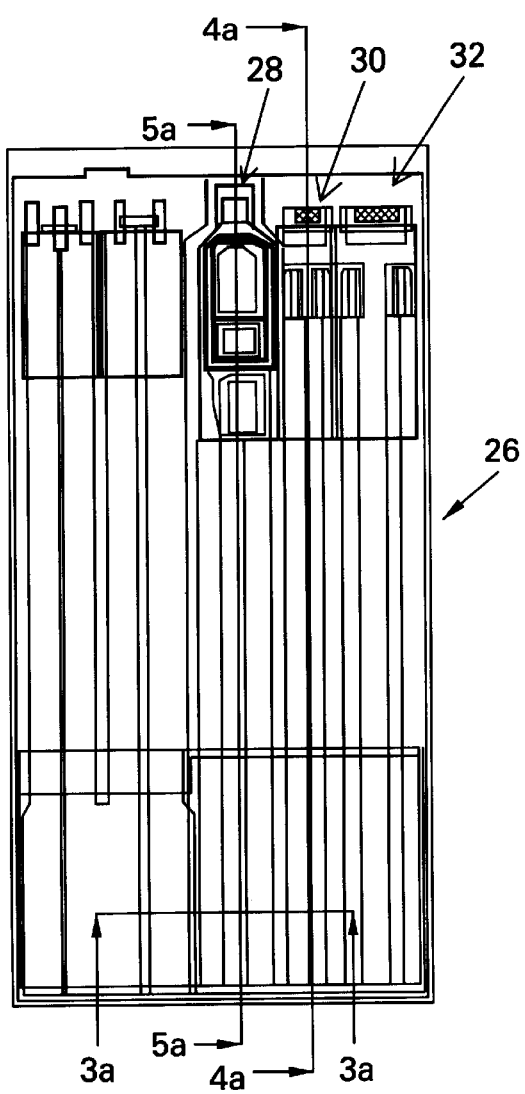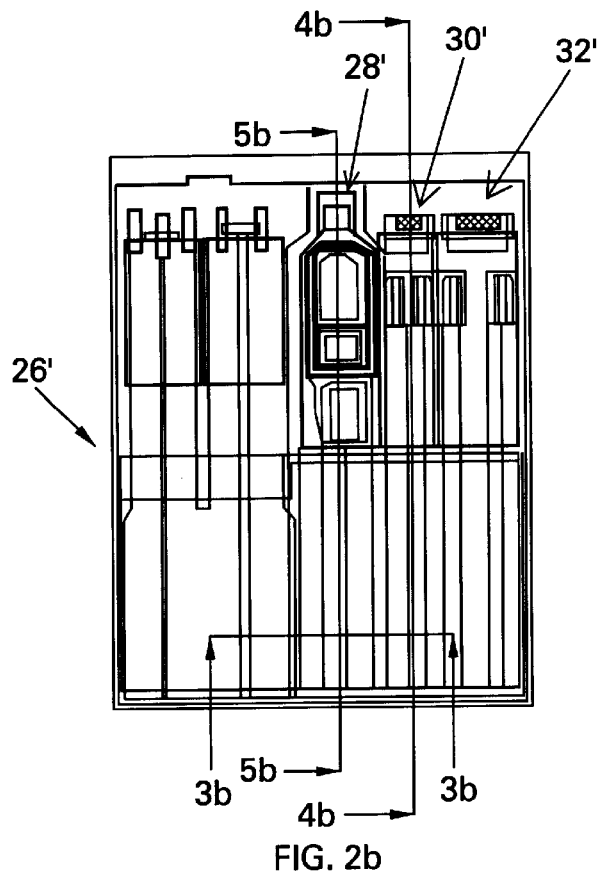
FIG. 2a
(PRIOR ART)
FIG. 2b

PLANARIZED SIDE BY SIDE DESIGN OF AN INDUCTIVE WRITER AND SINGLE METALLIC MAGNETORESISTIVE READER

TECHNICAL FIELD

The present invention relates generally to a thin film magnetic head particularly for magnetic recording, and more specifically to a magnetic head having read and write elements in an improved side by side configuration.

BACKGROUND ART

In high speed data processing systems, magnetic recording has been employed for large memory capacity requirements. Data is read from and written onto the magnetic recordings using magnetic transducers commonly called magnetic heads which are positioned adjacent the magnetic recording medium. For a contact recording, wherein the magnetic recording medium comes in contact with the magnetic head, the pole pieces are generally made of a magnetic ferrite material because of its wearing characteristics. The magnetic ferrite pole pieces, while having good wearing characteristics for the contact recording particularly with magnetic tape, however, lack the efficiency to record on high coercivity recording medium in the higher data density requirements for present day data recording. Magnetic heads having thin film pole pieces were developed to increase the saturation moment of the pole pieces and to increase the operating efficiency of the transducers, especially in the write or data recording procedure.

Thin film pole pieces, however, while providing the required efficiency to write the higher data density requirements, could not withstand the abrasion of the magnetic recording medium, especially in the contact recording situation. A first order requirement for high density recording is the minimizing of spacing between the surface of the media and the functional recording gap between the pole pieces. With the soft magnetic material thin film poletips of nickel-iron, for instance, the functional recording gap and the poletips are susceptible to wear by the media. Increasing the spacing between the recording gap and the media deteriorates the recording performance.

The write saturation performance characteristics of an interleaved, bi-directional, magnetic head operating in ferrite-trailing mode are not as good as those during operation in poletip-trailing mode. The mode of operation depends on the direction of tape travel: during ferrite-trailing mode, the tape travels across the gap towards the deposited poletip; in poletip-trailing mode, the tape travels towards the ferrite poletip. Regardless of write mode, a head experiences amplitude loss at high write currents. However, because of the lower saturation moment of the ferrite poletip compared to that of the deposited poletip, the amplitude loss is significantly more severe in ferrite-trailing mode. The problem thus presented is how to better balance the saturation moments of the poletips.

U.S. Pat. No. 5,296,993 describes a magnetic head with magnetic substrate and an enhanced poletip thereon. Specifically, an interleaved bi-directional magnetic tape head for contact recording can have a poletip enhanced by providing a thin film of a soft magnetic material deposited onto a magnetic ferrite substrate. The second pole piece is a thin film of the soft magnetic material. A closure block of a non-magnetic ceramic encloses the layers together with leveling insulation layers and a deposited activating conductor turns. The stripe poletip deposited onto the magnetic ferrite extends for a distance just short of the first conductor turn and provides a balancing of the saturation moment of the pole pieces and provides for better recording capability, especially when operating in a trailing magnetic ferrite mode.

While this patent is fine for its intended uses, it, like many references dealing with interleaved magnetic heads, has reader, servo, and writer contact pad areas at different levels, which complicates contacting procedures.

What is needed is a simplified contacting process that retains most, if not all, of the advantages of the prior art devices.

DISCLOSURE OF INVENTION

In accordance with the present invention, an interleaved bi-directional magnetic tape head is provided in which the read element, write element, and servo element are formed on a common substrate. Each element has a contact pad area electrically associated therewith, with each contact pad area located in a plane common to all contact pad areas. That is, the contact pad areas are planarized to each other.

As a result of such planarization, two gold conduction layers, required in the prior art, are reduced to one layer. Further, the total number of mask layers is reduced by two. Concomitantly, there is a reduction in the amount of process time. Additionally, the unit cell size is reduced by one-third of its original size.

BRIEF DESCRIPTION OF THE DRAWINGS

FIG. 2a is a top plan view of the prior art interleaved bi-directional magnetic head;

FIG. 2b is a top plan view of the magnetic head of the present invention, illustrating the reduced unit cell size;

DETAILED DESCRIPTION OF THE EMBODIMENTS

Figure 1:
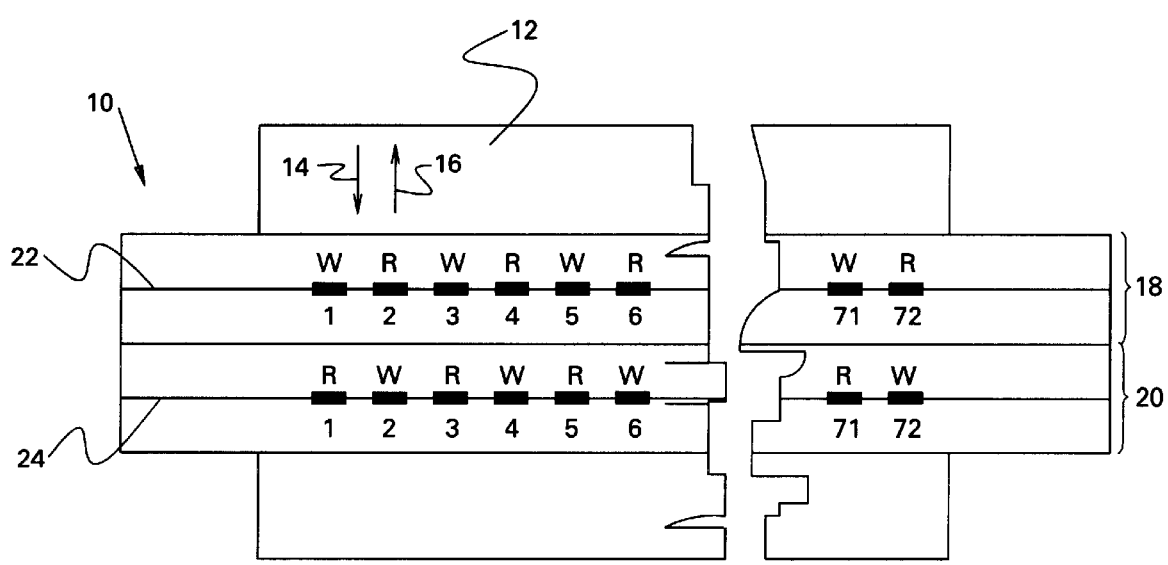
FIG. 1 is a diagrammatic perspective view of a section of an interleaved magnetic head that uses the elements of the present invention.

Referring now to the drawings in which like reference numerals refer to like elements throughout, an interleaved, thin film magnetic recording head 10 is shown in FIG. 1. The read elements are marked R for the magnetic head 10, while the write elements are marked W. The read and write gaps are used in immediately alternating, odd/even fashion. The term "alternating" is intended to include other formats. For example, one embodiment of the present invention provides a format of 72 tracks across the width of the media, hereinafter called tape media. One format provides that the odd numbered tracks, tracks 1, 3, 5, and so-forth, are operated during forward tape movement, while the even numbered tracks 2, 4, 6, and so-forth, are operative during the opposite direction of the movement of the tape media.

In general, the length of the magnetic tape 12 moves in both a forward and reverse direction as indicated by arrows 14 and 16. The arrow 14 designates the forward movement direction of the tape 12 and the arrow 16 designates the reverse direction. The magnetic tape 12 operates in transducing contact relationship with the magnetic head 10 in the conventional well-known format. The magnetic head 10 includes two modules 18 and 20 of generally identical construction. These two modules are bonded together to form a single physical unit. In this manner, the transducing gaps of one module are not only closely spaced to the transducing gaps of the other modules, but also the module gaps are accurately aligned in the direction of tape movement. There are 36 read transducers and 36 write transducers in each of the modules 18 and 20. The magnetic tape 12, therefore, has 72 tracks across its one-half inch width. Each module includes one gap line 22 for module 18 and one gap line 24 for module 20 to form the single physical unit of the magnetic head 10.

FIG. 2a is a plan view of a prior art unit cell 26 comprising a write element 28, a read element 30, and a servo element 32. The elements are formed on a substrate, not shown in this Figure, but visible in FIG. 3a, for example.

FIG. 2b is a plan view of the unit cell 26' of the present invention, also comprising the write element 28', the read element 30', and the servo element 32'. The unit cell 26' is seen to be considerably shorter than the prior art unit cell 26, for reasons which will become apparent. As an example, in one embodiment, the unit cell size is reduced by one-third from the device shown in FIG. 2a to the device shown in FIG. 2b.

While one write element 28, 28' and one read element 30, 30' are shown in FIGS. 2a, 2b, respectively, it will be appreciated that in fact a plurality of such elements, together with servo elements 32, 32' and ancillary elements are formed in a side-by-side arrangement, as shown in FIG. 1.

Figure 3A:
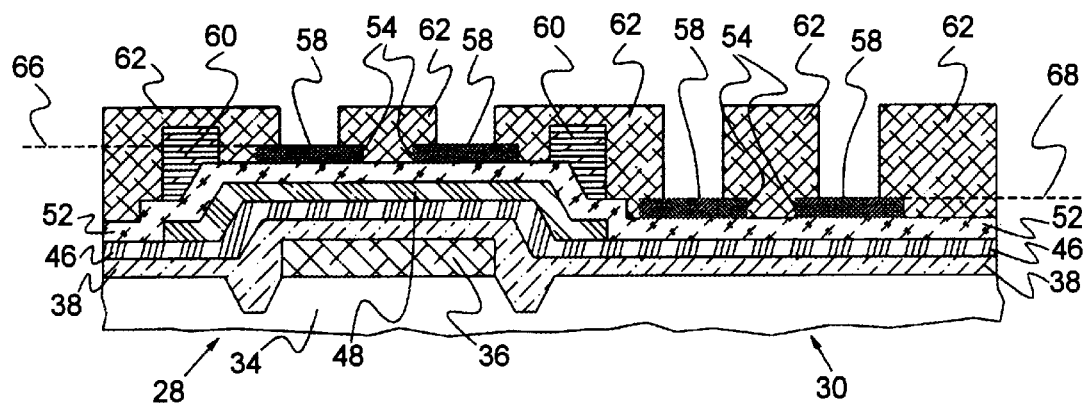
FIG. 3a is a cross-sectional view of a prior art interleaved bi-directional magnetic head, taken along the line 3a—3a of FIG. 2a, showing a reader and a writer side-by-side.
Figure 3B:
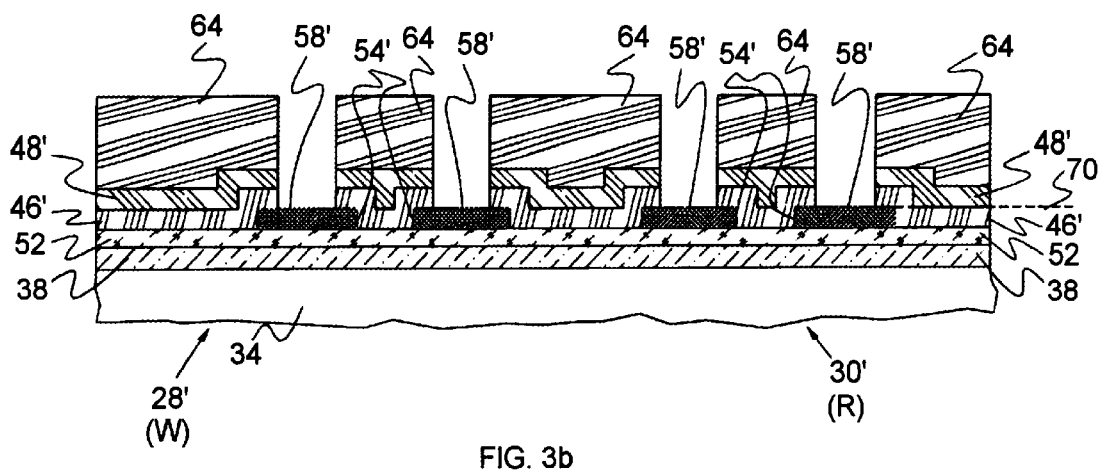
FIG. 3b is a view similar to that of FIG. 3a, but taken along the line 3b—3b of FIG. 2b.

FIGS. 3a and 3b, which are cross-sectional views of the faces of the heads, depict the write element 28 and 28' and the read element 30 and 30', respectively, in adjacent proximity. The servo unit 32 and 32' is not shown in these Figures, but could be on either side of the read or write elements, depending on the particular layout designed.

Figure 4A:
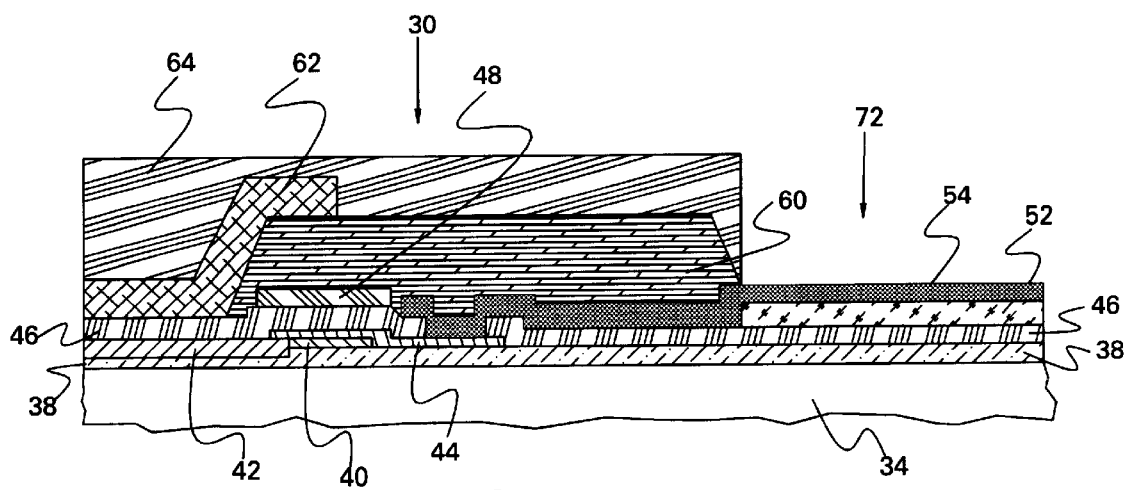
FIG. 4a is a cross-sectional view of the prior art interleaved bi-directional magnetic head, taken along the line 4a—4a of FIG. 2a, showing the details of the read element.
Figure 4B:
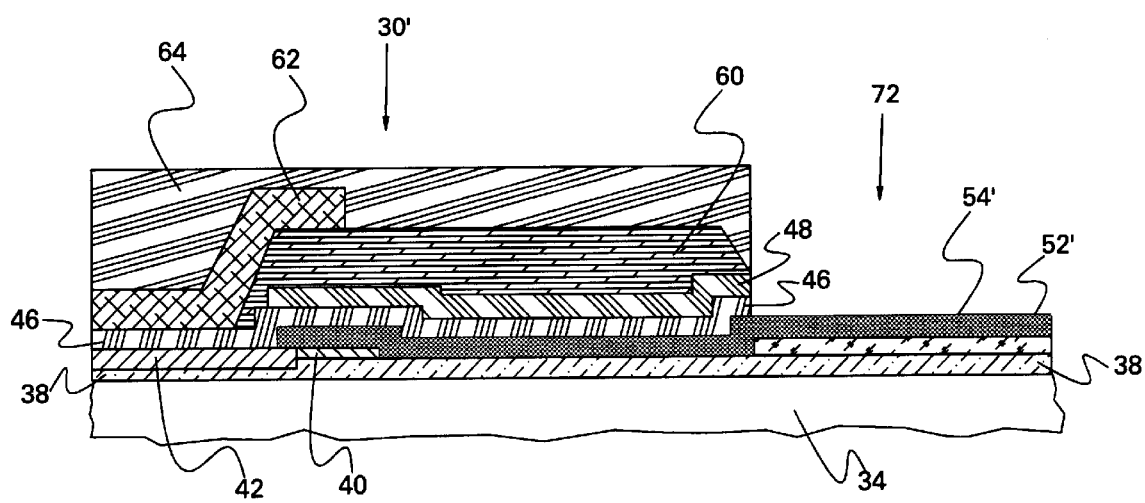
FIG. 4b is a view similar to that of FIG. 4a, but taken along the line 3b—3b of FIG. 2b.

FIGS. 4a and 4b, which are cross-sectional views of the read element 30 and 30', orthogonal to FIGS. 3a and 3b, respectively, depict the details of the various layers comprising the read element.

Figure 5A:
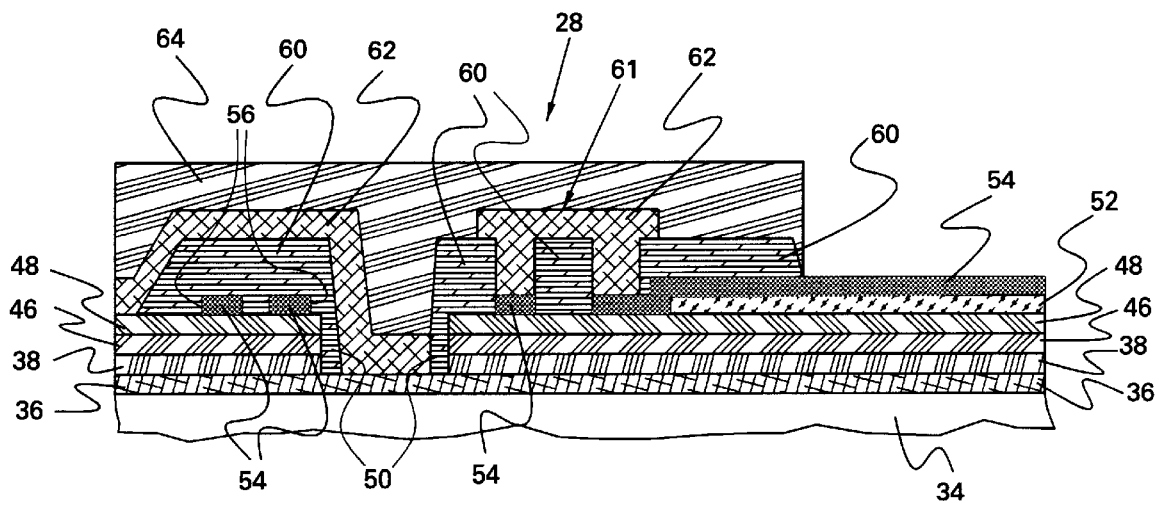
FIG. 5a is a cross-sectional view of the prior art interleaved bi-directional magnetic head, taken along the line 5a—5a of FIG. 2a, showing the details of the write element.
Figure 5B:
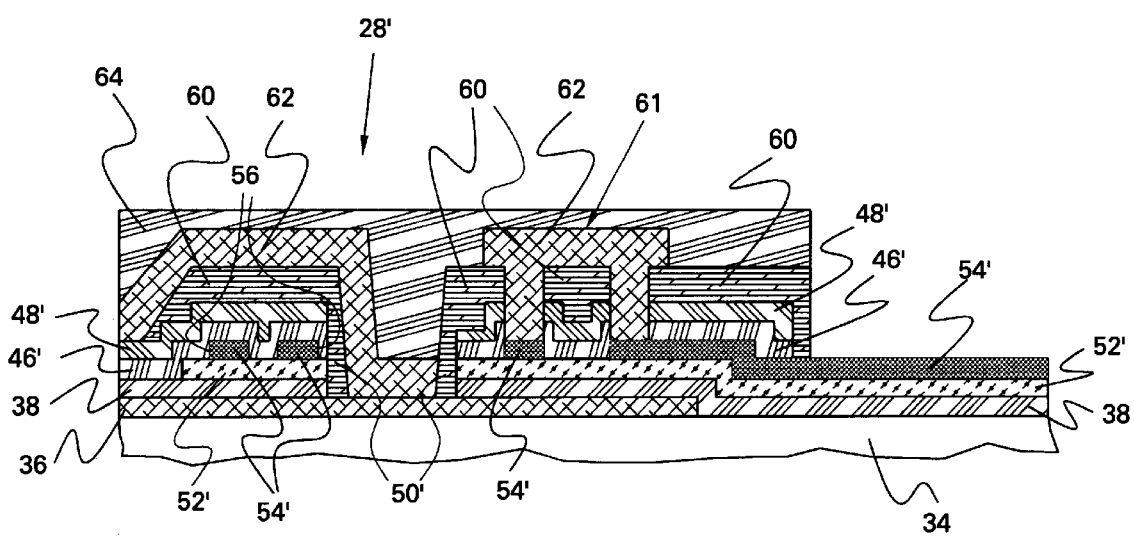
FIG. 5b is a view similar to that of FIG. 5a, but taken along the line 5b—5b of FIG. 2b.

FIGS. 5a and 5b, which are cross-sectional views of the write element 28 and 28', orthogonal to FIGS. 3a and 3b, respectively, depict the details of the various layers comprising the write element.

In FIGS. 2–5, the "a" figures depict the prior art interleaved bi-directional magnetic head, while the "b" figures depict the interleaved bi-directional magnetic head of the present invention. The discussion below requires consideration of FIGS. 2–5 for a fall understanding of the present invention. The prior art structure is described, which includes the structure of the present invention, but where changes are made in accordance with the invention, these are separately described, in order to point up the differences. More specific details of the prior art device may be found in U.S. Pat. Nos. 3,908,194; 4,685,005; and 5,208,714, which are assigned to the same assignee as the present invention.

The magnetic tape head of FIGS. 2–5 is formed on a substrate 34, which typically comprises a ferrite material, such as a magnetic nickel-zinc ferrite or a magnetic manganese-zinc ferrite or any of the magnetic ferrite materials known for use in magnetic heads. A first pole piece P1 36 is formed on a portion of the substrate 34. The first pole piece 36 typically comprises a Ni—Fe alloy, such as Permalloy. After ion milling and etching P1, a first insulating layer I1 38, typically $Al_2O_3$, is formed on the substrate 34 and over the first pole piece 36.

A magneto-resistive (MR) element 40, preferably comprising a soft bias material, is formed, along with a hard bias (HB) layer 42, both on a portion of the first insulating layer 38. Specifically, the soft bias material is deposited first, followed by deposition of the hard bias material. Then, the MR element and associated HB layer are defined at the same time. The MR element 40 typically comprises a permalloy layer, an insulating layer, and a soft bias adjacent layer, with the magnetic layers adjusted in composition to provide a near-zero magnetostriction, while the HB layer 42 typically comprises CoPt. The MR element 40 is formed behind the HB layer 42; together, these elements form the read unit 30, 30', seen in FIGS. 4a, 4b, respectively.

In the prior art device, a first metal layer 44, such as gold, is next deposited over the MR element 40 and contacting the HB layer 42. The gold layer 44, which actually comprises a three-layer structure of Ti/Au/Ti, is typically about 0.5 to 0.6 $\mu$m thick. A second insulating layer I2 46 is formed on the first insulating layer 38 as well as on the HB layer 42 and the first gold layer 44. A third insulating layer I2' 48 is formed on the second insulating layer 46. Although the two insulating layers 46, 48 may comprise any of the common insulating materials, since alumina is used elsewhere in the fabrication of the device, it is advantageously employed here as well. The third insulating layer 48 is patterned and portions thereof removed. In association with the read element 30 (FIGS. 4a and 4b), the third insulating layer 48 is removed over the HB layer 42, but left over the MR element 40 and extending to the back (contact) end of the device. A via 50 is next etched through a portion of the third insulating layer 48, the second insulating layer 46, and the first insulating layer 38 to expose an underlying portion of the first pole piece 36. A layer 52 of $SiO_2$, which acts as an etch stop layer, is next deposited. A second metal layer 54, again, gold, is then deposited and patterned to form coils 56 and contacts 58. The second gold layer 54 is also a three-layer structure of Ti/Au/Ti, having a thickness of about 3.5 $\mu$m.

In accordance with the present invention, the foregoing steps are revised to deposit only one gold layer 54', which is also patterned to form coils 56' and contacts 58'. Specifically, following formation of the MR element 40 and HB bias layer 42, a layer 52' of $SiO_2$, which also acts as an etch stop layer, is deposited. The gold layer 54' is then deposited and patterned as described above. As above, the gold layer 54' comprises the three-layer structure of Ti/Au/Ti, but is about 2.5 $\mu$m thick. The second insulating layer I2 46' is now deposited, followed by deposition of the third insulating layer I2' 48'. The via 50' is now etched, also down to the P1 layer 36.

Returning to the basic process, a cross-link layer 60 is next formed and patterned so as to cover (1) the MR element 40 back to the contact area and (2) the coils 56, 56' as well as provide a region for a subsequent P2 cross-over 61 behind the coils. The cross-link layer 60 typically comprises a layer of photoresist that has been crosslinked by light. The second pole piece P2 62 is next deposited, ion-milled, and etched. The second pole piece 62 comprises the same material, e.g., Ni—Fe, as the first pole piece 36. In the write device 28, 28'

(FIGS. 5a, 5b), the second pole piece 62 is formed on the third insulating layer 48 at the front of the device, is spaced above the coils 56, 56' by the cross-linked layer 60, and contacts the first pole piece 36 through the via 50, 50'. A protective overcoat layer 64, typically a mechanically hard dielectric, such as silica, alumina, silicon nitride, etc., is blanket deposited and, in the prior art device, is etched twice, once to open a via to the write element contact level 66, and one to open a via to the read element contact level 68. However, in the device of the present invention, the over-coat layer 64 is etched only once, to form vias to both read element and write element contacts 58', which are on the same level 70.

FIG. 3a depicts the two different contact levels 66, 68, required in the prior art device. The device of the present invention shown in FIG. 3b, however, has only one contact level 70.

As seen in FIGS. 4 and 5, the gold layer 54, 54' extends to a back contact area 72, which permits contact to be made, for example, to the MR device 40, From the foregoing process, two direct advantages provided by the device of the present invention are evident. First, the prior art process requires two additional process steps over that of the present invention. Second, the two gold conduction layers 44, 54 of the prior art, both at different contact levels 66, 68, are reduced to one gold layer 54', on one contact level 70.

One advantage of using only one gold layer 54' for contacting the MR element 40, is that the prior art design requires two separate gold layers 44 and 54, thereby increasing the possibility of poorer electrical contact.

In addition, shrinking the unit cell, as shown in FIGS. 2a and 2b, results in an increase in bandwidth, which is defined, in a thin film environment, as an increase in chip count per wafer. The reduction in unit cell size by the process of the present invention permits forming more chips on a wafer.

Further, the gold coils 56 of the prior art device are covered only by the cross-linked material 60, while the gold coils 56' of the device of the present invention are protected by two additional layers: insulating layer 46' and insulating layer 48'. The additional insulating layers 46', 48' serve to provide further protection to the coils 56'.

Finally, only one gold layer 54' is necessary for contacting the MR element 40, in contrast to the prior art design, which requires two separate gold layers 44 and 54, thereby increasing the possibility of poorer electrical contact.

INDUSTRIAL APPLICABILITY

The interleaved bi-directional magnetic tape head comprising a read element, a write element, and a servo element is expected to fund use in magnetic recording and playback applications.

Thus, there has been disclosed an interleaved bi-directional magnetic tape head comprising a read element, a write element, and a servo element formed on a substrate, wherein a single conducting layer is used for providing contacts to each element and for forming coils associated with the write element. It will be appreciated by those skilled in the art that various changes and modifications of an obvious nature may be made, and all such changes and modifications are considered to fall within the scope of the appended claims.

What is claimed is:

1. An interleaved bi-directional magnetic tape head comprising a read element, a write element that includes coils electrically associated therewith and a first pole piece and a second pole piece, with said coils spaced between said first pole piece and said second pole piece by first and second insulating materials, and a servo element formed on a substrate, each element having a contact pad electrically associated therewith, wherein:

(a) each said contact pad is located in a single plane spaced above said substrate and common to all said contact pads to thereby provide a single contact level;

(b) said contact pads consist of a single layer of an electrically conducting metal, said single layer located in said single plane; and (c) said coils also comprise said single layer of electrically conducting metal, with said second insulating material between said coils and said second pole piece, said second insulating material comprising two insulating layers and a cross-linked material.

2. The magnetic tape head of claim 1, wherein said electrically conducting metal comprises gold.

3. The magnetic tape head of claim 1 wherein said second pole piece is formed over said first pole piece, which in turn is disposed on said substrate, said coils being separated from said first pole piece by said first insulating material.

4. The magnetic tape head of claim 3 wherein said first insulating material comprises a first layer of alumina disposed on said first pole piece and a layer of silica disposed on said first layer of alumina, with said coils disposed on said layer of silica.

5. The magnetic tape head of claim 3 wherein said two insulating layers comprise a second layer of alumina disposed on and around said coils and a third layer of alumina disposed on said second layer of alumina, and said cross-linked material comprises a photoresist disposed on said third layer of alumina, with said second pole piece disposed on said cross-linked material.

6. The magnetic tape head of claim 1 wherein said electrically conducting metal is disposed on a silica layer, which in turn is disposed on an insulating layer comprising alumina, which in turn is disposed on said substrate.

7. The magnetic tape head of claim 6 wherein said silica layer and said insulating layer comprising alumina are associated with both said read element and said write element.

8. The magnetic tape head of claim 1 wherein said read element includes a magneto-resistive element and a hard bias layer, both located substantially in a common plane, said magneto-resistive element and said hard bias layer being electrically contacted by said single layer of said electrically conducting metal.

9. A method of forming an interleaved bi-directional magnetic tape head, comprising forming a read element, a write element that includes coils electrically associated therewith and a first pole piece and a second pole piece, with said coils spaced between said first pole piece and said second pole piece by first and second insulating materials, and a servo element on a substrate, each element having a contact pad electrically associated therewith, said method comprising (a) forming each said contact pad in a single plane spaced above said substrate and common to all said contact pads to thereby provide a single contact level;

(b) forming said contact pads from a single layer of an electrically conducting metal, said single layer being formed in said single plane;

(c) forming said coils in said single layer of electrically conducting metal; and (d) forming said second insulating material on top of said coils, said second insulating material comprising, in order, a first insulating layer on said coils, a second insulating layer on said first insulating layer, and a cross-linked layer on said second insulating layer.

10. The method of claim 9, wherein said electrically conducting metal comprises gold.

11. The method of claim 9 wherein said second pole piece is formed over said first pole piece, which in turn is disposed on said substrate, said coils being separated from said first pole piece by said first insulating material.

12. The method of claim 11 wherein said first insulating material comprises a first layer of alumina disposed on said first pole piece and a layer of silica disposed on said first layer of alumina, with said coils disposed on said layer of silica.

13. The method of claim 11 wherein said first and second insulating layers comprise a second layer of alumina disposed on and around said coils and a third layer of alumina disposed on said second layer of alumina, and said cross-linked layer comprises a photoresist disposed on said third layer of alumina, with said second pole piece disposed on said cross-inked layer.

14. The method of claim 9 wherein said electrically conducting metal is disposed on a silica layer, which in turn is disposed on an insulating layer comprising alumina, which in turn is disposed on said substrate.

15. The method of claim 14 wherein said silica layer and said insulating layer comprising alumina are associated with both said read element and said write element.

16. The method of claim 9 wherein said read element includes a magneto-resistive element and a hard bias layer, both located in a common plane, said magneto-resistive element and said hard bias layer being electrically contacted by said single layer of said electrically conducting metal.

* * * * *